(No Model.)
E. J. SCHUMAN.
PULVERIZER.
No. 353,973. Patented Dec. 7, 1886.
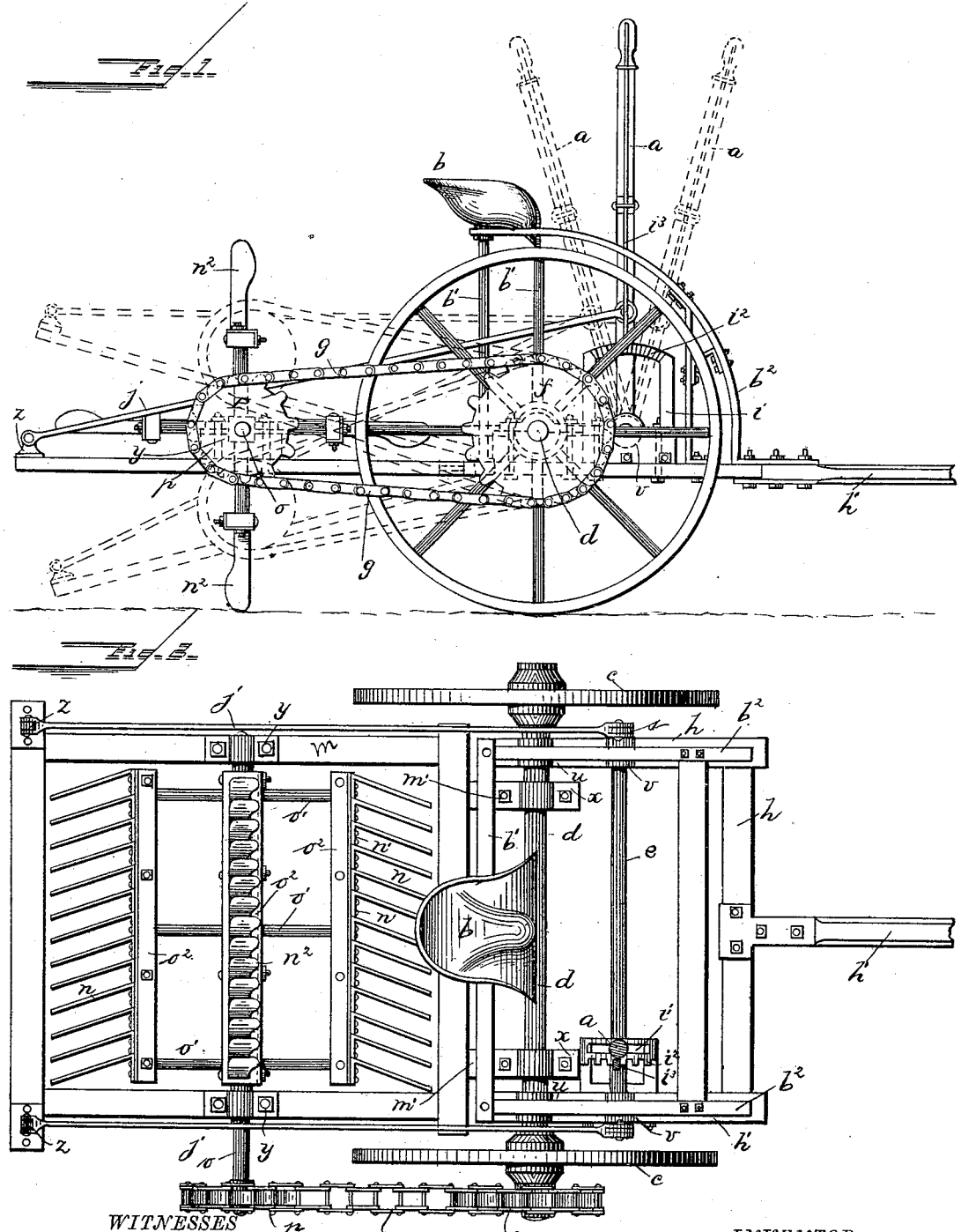
WITNESSES
J. L. Durand
Jno. T. Suter
INVENTOR
Edward J. Schuman
By Frank A. Forts
Attorney

UNITED STATES PATENT OFFICE.

EDWARD J. SCHUMAN, OF NATCHITOCHES, LOUISIANA.

PULVERIZER.

SPECIFICATION forming part of Letters Patent No. 353,973, dated December 7, 1886.

Application filed August 9, 1886. Serial No. 210,439. (No model.)

*To all whom it may concern:*

Be it known that I, EDWARD J. SCHUMAN, a citizen of the United States, residing at Natchitoches, in the parish of Natchitoches, State of Louisiana, have invented certain new and useful Improvements in Pulverizers, of which the following is a specification, reference being had therein to the accompanying drawings.

The invention relates to improvements in earth-pulverizing machines, the object being to construct such a machine whereby the soil may be pulverized or harrowed to any desired depth—say from one to twelve inches—without the prior removal of the old cotton or corn stalks or stubble.

The invention consists in the hereinafter-described construction and novel arrangement of parts, which are illustrated in the accompanying drawings, and pointed out in the claims hereto appended.

Figure 1 represents a side view of the machine, showing three positions of the pulverizing-frame and pulverizer, and Fig. 2 is a plan view of the same.

Referring to the accompanying drawings by letter, $h$ designates the main frame of the machine, of general rectangular shape, and having secured to its front transverse beam a rail, the rear end of the tongue, $h'$, which carries a proper clevis at its outer end.

$d$ is the axle turning in the journal-boxes, which stand upward from the side rails of the frame near its rear end. $c$ are the wheels secured upon the axle $d$, so that it rotates with them.

$b$ is the driver's seat, supported upon the standard-frame $b'$, rising from the main frame, and by the frontward and downward stay-bars, $b^2$. The axle $d$ has secured upon it, outside the hub of the wheel on one side, a chain-wheel, $f$, the function of which is hereinafter explained.

$m$ is the rectangular pulverizer-frame in rear of the main frame $h$, and having secured to its front rail the two similar bars. The said bars have secured to the upper surfaces of their outer ends the journal-boxes $x\,x$, which surround the axle $d$ and turn thereon, so that the frame $m$ can swing on the axle.

$o$ is a shaft journaled centrally and transversely in bearing blocks or boxes $y$, secured to the upper surfaces of the side rails of the frame $m$, as in Fig. 2. The said shaft has secured to it a frame composed of the bars $o'$ and rails $o^2$, the bars $o'$ being secured to the shaft in pairs, the members of which are at right angles to each other, and the rails joining the end of the bars, so that there are four equidistant rails. To the outer edges of the bars are secured the pulverizer-blades or cutter-knives $n$, preferably by bolts or screws passing through their feet $n'$ into the rails, or into metal plates secured thereto. The blades have preferably the rounded cutting-ends $n^2$, and those on each rail are inclined equally from the perpendicular to the same, as shown in Fig. 2. The blades on adjacent rails are inclined equally, but in opposite directions.

$p$ is a chain-wheel secured to the extended end of the shaft $o$ on the same side as the chain-wheel $f$, and $g$ is the chain by means of which the former is actuated by the latter. The wheel $f$ has a diameter equal to one and one-half that of the wheel $p$, so that the pulverizer will turn one and one-half times while the drive-wheels $c$ turn one time.

It is evident that the rotation of the wheels and axle will, by means of the chain-wheels and chain, cause the rotation of the pulverizer frame and blades.

The mechanism by which the pulverizer-frame is raised and lowered, so as to make the blades cut more or less deeply in the soil, or to raise them above the same, when necessary, is as follows: $e$ is a transverse shaft turning in journal-boxes $v$, secured to the side rails of the main frame a proper distance in front of the axle, and $a$ is a lever-handle having its lower end secured to the said shaft, so as to make the latter rotate when said handle is moved. The shaft of the handle-lever passes through a curved slot, $i'$, concentric with the axis of the shaft $e$, and made in the outstanding flange of a bracket-standard frame, $i$, which has the ends of its legs bent horizontally and secured to the side of the main frame, as in Fig. 2. On the edge of said flange is made a rack, $i^2$. $i^3$ is a detent-rod sliding in staples on the side of the lever-handle, with its lower end arranged to engage between the teeth of the rack. It may be depressed to engage the same, either by gravity or a proper spring, and lifted out of engagement, when necessary, by the driver, who occupies the seat $d$. The lever-handle can thus be locked in position at any desired part of the rack. $s\ s$ are arms secured to and rising from the ends of the shaft $e$ outside of its bearings, and $j\ j$ are connecting-rods, between the front bifurcated ends of which the upper ends of the arms $s$ are pivoted. $z\ z$ are eyebolts or joints rising from the upper surface of the ends of the rear rail of the frame $m$, and which are pivoted between the bifurcated rear ends of the rods $j\ j$. Thus the forward motion of the lever-handle $a$ raises the pulverizer by means of the arms $s$ and rods $j$, and its rearward motion depresses the same.

The frame of the machine may be either of wood or metal, and pulleys and belting may, if desired, be used for the chain-wheels and chain. The latter construction is, however, preferable.

The inclination of the pulverizer-blades causes them to have a digging as well as cutting motion, and the reversal of the inclination of adjacent lines of blades causes the direction of the digging motion to be reversed alternately, so that the soil is more perfectly pulverized. In the three positions shown in Fig. 1 the blades in the central one would penetrate the earth very slightly. In the lowest one they would cut deeply and in the highest one they would be raised clear from the ground, as would be necessary when transporting the machine from one field to another.

Having thus described my invention, I claim as new and desire to secure by Letters Patent—

1. In a pulverizing-machine, the combination of the main frame, the axle journaled thereon and turning with the wheels, the pulverizer-frame, the pulverizer having its shaft journaled thereon, the connecting-rods pivoted at either end upon the eye-joints $z$ and the arms $s$, the shaft $e$, journaled on the main frame, the bracket-standard $i$, having the slot $i'$ and rack $i^2$, the lever-handle $a$, and the detent-rod $i^3$, substantially as specified.

2. In a pulverizing-machine, a rotating pulverizer having its shaft $o$ journaled in bearings secured to the pulverizer-frame, and composed of the bars $o'$ and rails $o^2$, secured to the ends of the same, and the sets of oppositely-inclined blades $n$, bolted or otherwise secured by their feet $n'$ to the outer edge of the rails $o^2$, substantially as described.

3. In a pulverizing-machine, the combination of the main frame, an axle journaled therein and provided with the main wheels, a rear frame having its forward end journaled to said axle, a shaft centrally located in boxes on the forward frame forward of the main axle, said shaft being provided on its ends with upwardly-projecting arms, and also provided with a lever and rack, and rods $j$, jointed to said arms at their forward ends and pivoted at their rear ends to the rear end of the rear frame, substantially as described, and for the purposes set forth.

In testimony whereof I affix my signature in presence of two witnesses.

EDWARD J. SCHUMAN.

Witnesses:
 JNO. A. BARLOW,
 D. PIERSON.